(12) United States Patent
Bitela et al.

(10) Patent No.: US 8,663,775 B2
(45) Date of Patent: Mar. 4, 2014

(54) FLOOR COVER AND METHODS OF USE THEREOF

(76) Inventors: Marcos Bitela, Midwest City, OK (US); Pamela Bitela, Midwest City, OK (US)

( * ) Notice: Subject to any disclaimer, the term of this patent is extended or adjusted under 35 U.S.C. 154(b) by 157 days.

(21) Appl. No.: 13/316,140

(22) Filed: Dec. 9, 2011

(65) Prior Publication Data

US 2012/0148787 A1    Jun. 14, 2012

Related U.S. Application Data

(60) Provisional application No. 61/421,886, filed on Dec. 10, 2010.

(51) Int. Cl.
*B32B 3/02* (2006.01)

(52) U.S. Cl.
USPC .............................................. 428/80; 428/81

(58) Field of Classification Search
USPC ....................................................... 428/80, 81
See application file for complete search history.

(56) References Cited

U.S. PATENT DOCUMENTS

| | | | |
|---|---|---|---|
| 5,489,459 A * | 2/1996 | Nauman | 428/43 |
| 2001/0002615 A1 * | 6/2001 | Lacross et al. | 160/351 |
| 2011/0017341 A1 * | 1/2011 | Terracino et al. | 139/383 R |

* cited by examiner

*Primary Examiner* — Alexander Thomas
(74) *Attorney, Agent, or Firm* — Hall Estill Law Firm

(57) ABSTRACT

A floor cover for protecting a floor from damage caused by pets. The floor cover includes a body having an ingress/egress portion, a doorway portion, and an enclosure portion.

18 Claims, 3 Drawing Sheets

FLOOR COVER AND METHODS OF USE THEREOF

CROSS-REFERENCE TO RELATED APPLICATIONS

The present application claims benefit under 35 U.S.C. §119(e) of U.S. Provisional Application Ser. No. 61/421,886, filed Dec. 10, 2010, which is hereby expressly incorporated herein by reference in its entirety.

FIELD OF THE INVENTION

The present invention relates generally to floor coverings, and more particularly, not by way of limitation, to an improved floor cover for protecting a floor from damage by a pet.

BACKGROUND OF THE INVENTION

Many people keep pets in a room of a house or apartment. Some pets do not like being confined and attempt to get out of the room. Damage can occur when a pet is left alone trying to get out of the room, house, or apartment. The pet typically tears at the carpet or flooring of the room in an attempt to get out. The rip or damage normally begins at the doorway and worsens by spreading throughout the room. Further, if a pet can see and reach carpet on the other side of the door, damage can occur in this manner as well. The damage caused by pets may be costly to home owners, renters, and businesses.

To protect an existing flooring under doorways from being ripped, torn or damaged by a confined pet, a cover can be used to prevent damage. A carpet joint when flooring transitions from carpet to tile or wood flooring may be protected. The cover can also be used to prevent pets from attempting entry into a room.

To this end, although floor coverings of the existing art are operable, further improvements are desirable to enhance the use of a floor cover which is portable and functions to prevent damage to carpet and flooring. It is to such a floor cover that the present invention is directed.

SUMMARY OF THE INVENTION

The present invention is directed to a cover for protecting and covering an existing floor in a doorway. The cover includes a body having a first end, a second end, a first side, a second side, an outer peripheral edge, an upper surface and a lower surface. The first side is provided with a first portion for receiving one side of the doorway and the second side is provided with a second portion for receiving an opposing side of the doorway. The first portion extends inwardly from the first side of the body to receive one side of the doorway. In one embodiment, the first portion is provided with a substantially U-shaped configuration. In another embodiment, the first portion extends inwardly from the first side of the body to an end. The first portion is provided with a notch extending inwardly from the end for receiving the one side of the doorway. The notch is provided with a substantially U-shaped configuration. In one embodiment, the first portion extends inwardly from the first side of the body to an end. The end of the first portion is provided with a plurality of tabs for adapting the floor cover to various sized doorways. The second portion extends inwardly from the second side of the body to receive one side of the doorway. In one embodiment, the second portion is provided with a substantially U-shaped configuration. In another embodiment, the second portion extends inwardly from the second side of the body to an end to receive an opposing side of the doorway from the first portion. The second portion is provided with a notch extending inwardly from the end for receiving the opposing side of the doorway. The notch is provided with a substantially U-shaped configuration.

In one embodiment, the second portion extends inwardly from the second side of the body to an end. The end of the second portion is provided with a plurality of tabs for adapting the floor cover to various sized doorways.

The body of the floor cover has an ingress/egress portion sized and configured to prevent damage to the ingress/egress of the floor of the doorway, an enclosure portion sized and configured to prevent damage to the floor of a room, and a doorway portion extending between the ingress/egress portion and the enclosure portion for preventing damage to the floor in the doorway. The outer peripheral edge of the floor cover has at least one of a non-linear, irregular, and linear pattern. The upper surface is provided with an abrasive material. The lower surface is provided with a non-skid material.

The body of the floor cover is positioned on an existing floor about a doorway. The first end of the floor cover is positioned on one side of the doorway. The first portion of the first side of the body is positioned about one side of the doorway and the second portion of the second side of the body is positioned about the opposing side of the doorway so that the first and second portions cooperate to hold the floor cover in a substantially secure position in the doorway. The second end of the floor cover is positioned on an opposing side of the doorway from the first end of the floor cover. In another embodiment, at least one tab is removed from the first portion and/or the second portion so that the floor cover is sized to be positioned in various sized doorways.

DETAILED DESCRIPTION OF THE INVENTION

Figure 1:
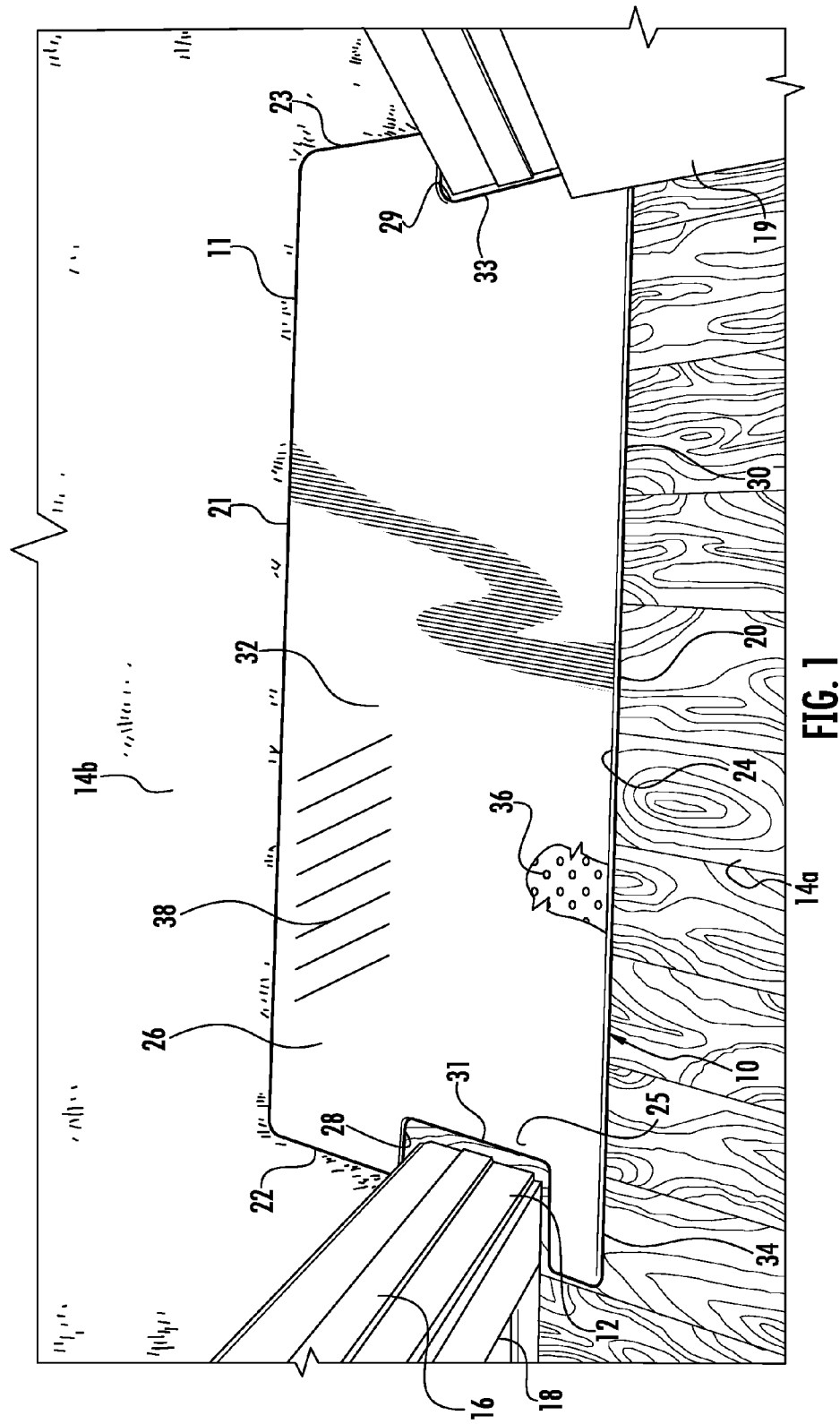
FIG. 1 is a top view of a floor cover constructed in accordance with the present invention, the floor cover positioned in a doorway.

Referring now to the drawings, and more particularly to FIG. 1, shown therein is a floor cover 10 constructed in accordance with the present invention, the floor cover 10 being shown positioned in a doorway 12 on an existing floor 14. The doorway 12 has a door jamb 16 and is positioned within an interior wall 18 in a conventional manner. It should be understood that the floor cover 10 may be sized and dimensioned to fit any doorway. Further, it should be understood that although, as shown, the floor cover 10 is positioned in the doorway 12 for an interior door 19 positioned within the interior wall 18, the floor cover 10 may be positioned in a doorway for an exterior door within an exterior wall, so long as the floor cover 10 is utilized and functions in accordance with the present invention as described herein. The floor 14 may be carpet, wood, wood products, tile, composite material, or any other such material used to construct a floor. By way of example, as described herein, the floor 14 is shown as wood 14a and carpet 14b.

It is contemplated that the floor cover 10 is constructed from one solid piece of material, however, it should be understood that the floor cover 10 may be constructed from various components. The floor cover 10 is preferably made of a durable and rigid material which is strong enough to allow an individual or pet to walk on, and a pet to scratch, bite, and/or tear and prevent damage to the floor cover 10 and the floor 14 under the floor cover 10. Suitable materials for construction of the floor cover 10 and any components thereof include polymeric materials, plastics, metals such as aluminum, steel, titanium, magnesium or alloys containing these metals, woods, abrasive materials, permeable materials, impermeable materials, and/or composite materials which are capable of providing the desired strength and durability for the floor cover 10. The material may be water-resistant or waterproof so that the floor cover 10 may be easily cleaned and/or disinfected after use. The floor cover 10 may be injected molded. Further, it will be appreciated that the floor cover 10 can be sized and shaped from any suitable material, that is completely or partially positioned in a doorway 12 in a manner that protects the floor 14 and/or otherwise functions as described herein. It should be understood by one of ordinary skill in the art that the floor cover 10, although discussed herein as being used with a pet, may be utilized and configured in a variety of shapes and capacities for other animals and the like. The floor cover 10 is shown as substantially rectangular in shape, however, it should be understood that the floor cover 10 or portions thereof may be any shape, such as circular, oval, square, rectangular, triangular, polygonal, quadrilateral, ellipsoidal and the like, for example. The floor cover 10 may be rigid, semi-rigid, flexible, semi-flexible, foldable, collapsible, and the like. It should be understood that the size and configuration of the floor cover 10, and portions thereof, may vary widely dependent upon the size of the doorway 12 and the area of the floor 14 for which protection is desired.

The floor cover 10 includes a body 11 having a first end 20, a second end 21, a first side 22, and a second side 23. The floor cover 10 has an ingress/egress portion 24, a doorway portion 25, and an enclosure portion 26. The ingress/egress portion 24 is positioned about the ingress/egress of a room, for example, and extends a distance from the door jamb 16. Namely, the ingress/egress portion 24 extends from the first end 20 of the floor cover 10 to a portion of the doorway portion 25. The ingress/egress portion 24 is sized and configured in a variety of ways necessary to prevent a pet from causing damage to the ingress/egress portion 24 of the floor 14a of the doorway 12.

The doorway portion 25 extends between the ingress/egress portion 24 and the enclosure portion 26. The doorway portion 25 is sized and dimensioned to be positioned about the door jamb 16, an interior wall 18, or an exterior wall (not shown). The doorway portion 25 has a first portion 28 for receiving one side of the doorway 12 and a second portion 29 for receiving an opposing side of the doorway 12. The first and second portions 28 and 29 cooperate so that the floor cover 10 is securely disposed in the doorway 12. However, it should be understood by one of ordinary skill in the art that the first portion 28 and/or the second portion 29 may be configured to secure the floor cover 10 independent of the other.

The first portion 28 is provided with a substantially U-shaped configuration extending inwardly from the first side 22 of the floor cover 10 to an end 31. The second portion 29 is provided with a substantially U-shaped configuration extending inwardly from the second side 23 of the floor cover 10 to an end 33. It should be understood that although the first and second portions 28 and 29 are provided with a substantially U-shaped configuration, the doorway portion 25 may be configured in a variety of ways to function with a variety of shaped and sized doorways so long as the doorway portion 25 functions in accordance with the present invention to receive a portion of the doorway 12.

The doorway portion 25 may be sized to be positioned beneath the door 19 such that the door 19 may be opened and closed when the floor cover 10 is positioned in the doorway 12. The doorway portion 25 may also be sized and configured to keep the door 19 open and/or closed.

The enclosure portion 26 is positioned in the room on the floor 14b. The enclosure portion 26 extends a distance into the room from the door jamb 16. Namely, the enclosure portion 26 extends from a portion of the doorway portion 25 to the second end 21. The enclosure portion 26 may be sized and configured in a variety of ways necessary to prevent a pet from causing damage to the floor 14b of the room.

The floor cover 10 also includes a lower surface (not shown) and an upper surface 32, and an outer peripheral edge 34. The lower surface is generally planar. It is to be understood that the present invention contemplates that the lower surface can be contoured and/or textured to provide a gripping surface to the existing floor 14. A portion of the lower surface of the floor cover 10 may be provided with at least one fastener 36 for removably securing the floor cover 10 to the floor 14. The fastener 36 may be any such fastener known in the art for fastening or removably securing one object to another including, for example, suction device, Velcro-type fasteners, adhesive substances, and the like. The fastener 36 may also be provided as a non-skid material such that the floor cover 10 remains stationary when the pet exerts force on the upper surface 32 of the floor cover 10.

The upper surface 32 of the floor cover 10 is generally planar. It is to be understood by one of ordinary skill in the art that the upper surface 32 can be contoured, textured, and/or colored to provide a design which enhances the interior of the room and/or prevents a pet from approaching the doorway 12. A portion of the upper surface 32 of the floor cover 10 may be provided with an abrasive material 38 or some other material to prevent a pet from approaching the doorway 12. That is, the upper surface 32 may be provided with vertical portions of material disposed on the upper surface 32 to further prevent a pet from approaching the doorway 12. A design or decorative pattern or material may be printed or embossed on either the lower surface, the upper surface 32, or both the lower surface and the upper surface 32 of the floor cover 10. Each surface of the floor cover 10 may vary in the combination of such characteristics.

At least a portion of the edge 34 of the floor cover 10 may be positioned adjacent the wall 18 or a baseboard of the wall 18. A portion of the edge 34 may be non-linear rather than straight. It will be understood that the edge 34 may have a non-linear pattern, such as substantially rounded, angular, or may have a combination of a linear and non-linear pattern or an irregular pattern. The edge 34 may have any other configuration allowing the floor cover 10 to be positioned in the doorway 12, as described herein which prevents damage to the floor 14, the wall 18, or any other portion of the substantially surrounding doorway 12.

In use, a door into a room is opened and the enclosure portion 26 of the floor cover 10 is positioned on the floor of the room where the pet is located and/or kept. Each of the first and second portions 28 and 29 of the doorway portion 25 are cooperatively moved and/or slid about the jamb 16/sides of the doorway 12 so that the doorway portion 25 is positioned in the doorway 12. The ingress/egress portion 24 is positioned exterior the door into and out of the room. The door 19 can be shut, or a barricade for keeping the pets in a room may be secured, in order to keep the pet in a room. It should be understood by one of ordinary skill in the art that the portions of the floor cover 10 may be positioned in a variety of ways in order to function in accordance with the present invention. When not in use, the floor cover 10 is easily stowed or moved, to allow for the floor traffic to proceed normally.

Figure 2:
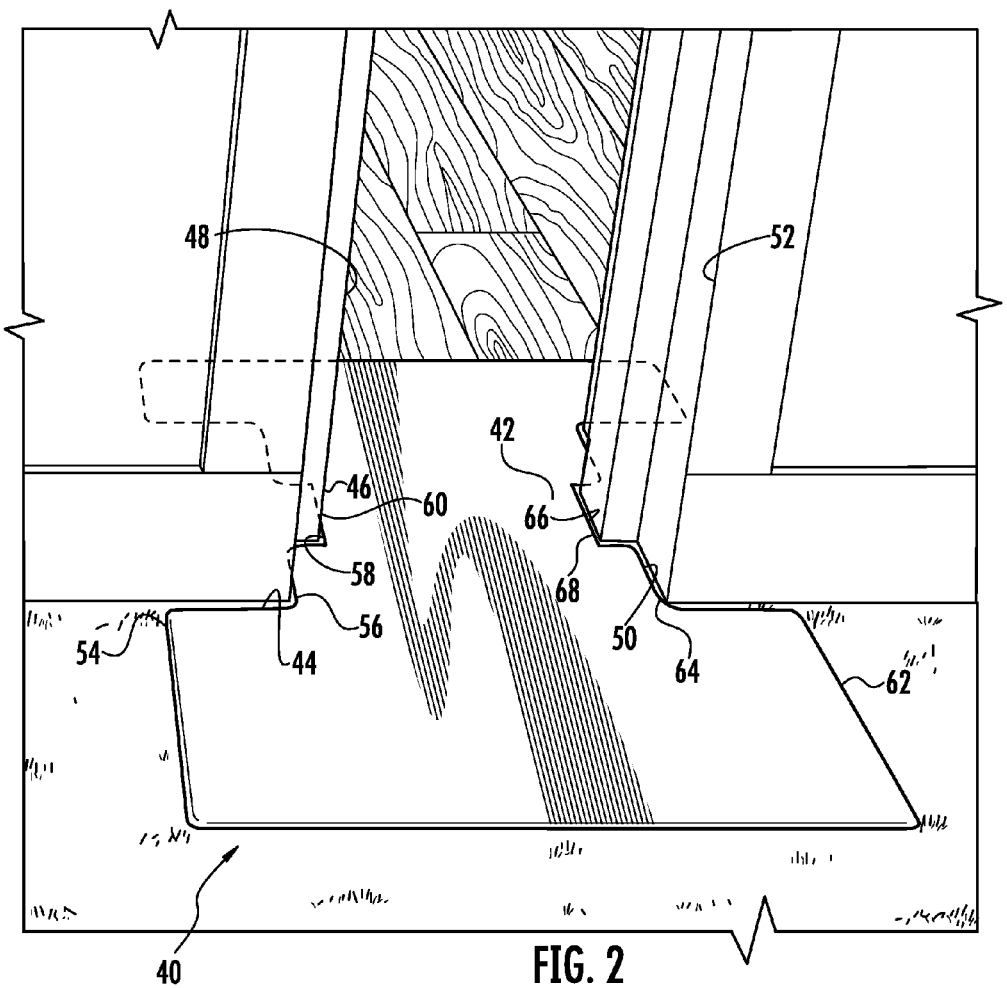
FIG. 2 is a perspective view of another embodiment of a floor cover constructed in accordance with the present invention.

Referring now to FIG. 2, shown therein is another embodiment of a floor cover designated by the numeral 40 which is similar to the floor cover 10, except as described herein. A doorway portion 42 has a first portion 44 for receiving one side 46 of a doorway 48 and a second portion 50 for receiving an opposing side 52 of the doorway 48. The first portion 44 of the doorway portion 42 is provided with a substantially U-shaped configuration extending inwardly from a first side 54 of the floor cover 40 to an end 56. The first portion 44 is provided with a substantially U-shaped notch 58 extending inwardly from the end 56 to an end 60 for receiving a customized portion of the side of the doorway 48.

The second portion 50 is provided with a substantially U-shaped configuration extending inwardly from a second side 62 of the floor cover 40 to an end 64. The second portion 50 is provided with a substantially U-shaped notch 66 extending inwardly from the end 64 to an end 68 for receiving a customized portion of the side of the doorway 48. It should be understood that although the first and second portions 44 and 50 and the notches 58 and 66 are provided with a substantially U-shaped configuration, the doorway portion 42 may be configured in a variety of ways to function with a variety of shaped and sized doorways so long as the doorway portion 42 functions in accordance with the present invention to receive a portion of the doorway 48.

Figure 3:
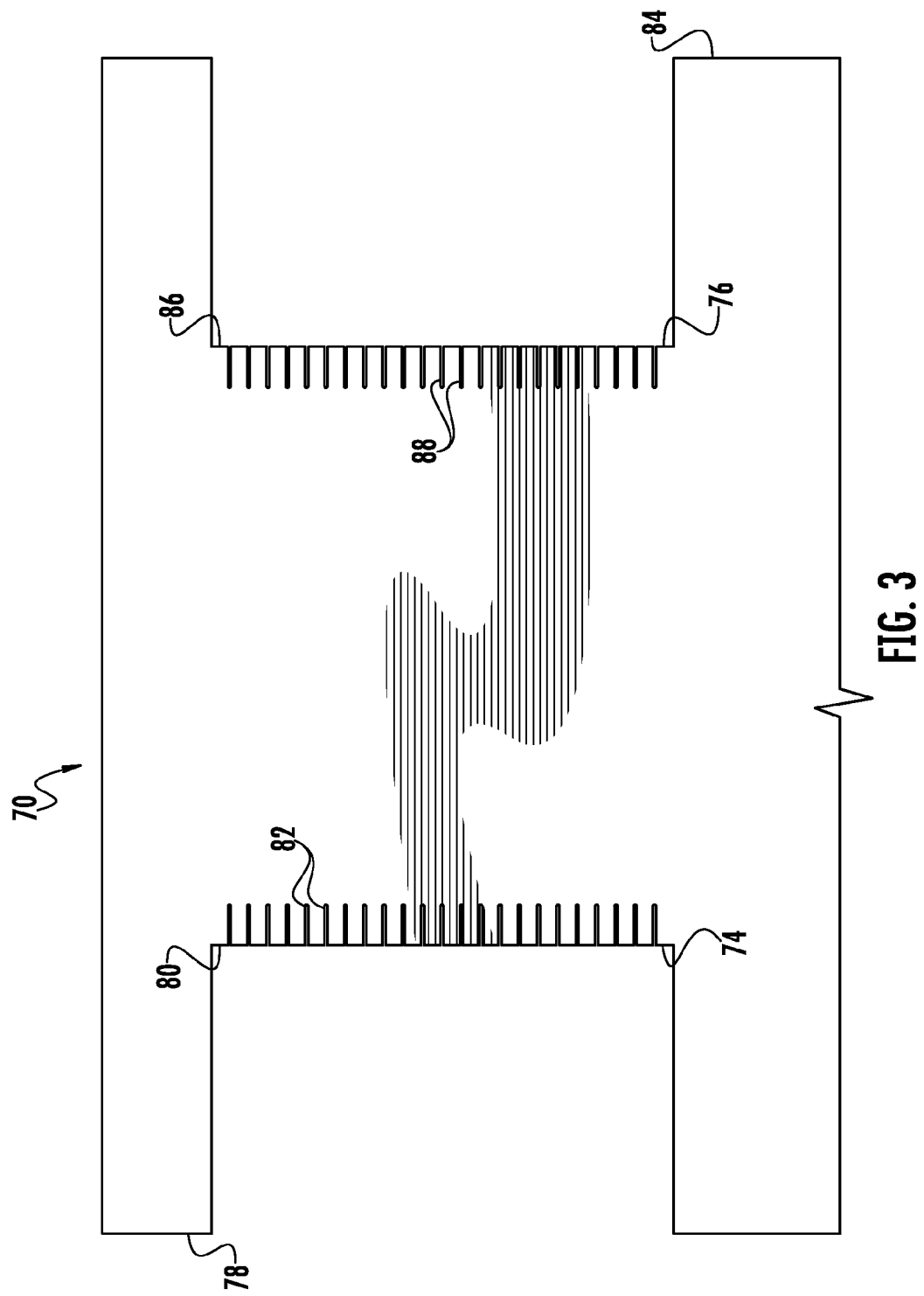
FIG. 3 is a top view of another embodiment of a floor cover constructed in accordance with the present invention.

Referring to FIG. 3, shown therein is another embodiment of a floor cover 70. The floor cover 70 is similar to the floor cover 10, except as described herein. A doorway portion 72 has a first portion 74 for receiving one side of a doorway (not shown) and a second portion 76 for receiving an opposing side of the doorway. The first portion 74 is provided with a substantially U-shaped configuration extending inwardly from a first side 78 of the floor cover 70 to an end 80. The end 80 of the first portion 74 of the doorway portion 72 is provided with a plurality of tabs 82.

The second portion 76 is provided with a substantially U-shaped configuration extending inwardly from a second side 84 of the floor cover 70 to an end 86. The end 86 of the second portion 76 is provided with a plurality of tabs 88. The plurality of tabs 82 and 88 are used to customize and/or adapt the floor cover 70 to different molding/sizes, etc. within a doorway. Each of the plurality of tabs 82 and 88 are spaced a distance from one another. In order to adapt the floor cover 70 to the sides of the doorway, in use, at least one of the plurality of tabs 82 and 88 are removed to form an appropriately sized notch for receiving the portion of the side of the doorway so that the doorway portion 72 of the floor cover 70 can be positioned to fit into the doorway. Each of the plurality of tabs 82 and 88 may be removed by cutting, tearing, and/or any method understood by one of ordinary skill in the art for removing material in order to configure the floor cover 70 to be positioned in the appropriate sized doorway. It should be understood by one of ordinary skill in the art that although tabs are discussed herein for removing material from the floor to form a notch to receive a portion of the side of a doorway, any method for removing material to create a space for receiving the side of a doorway may be utilized so long as the method functions in accordance with the present invention.

From the above description, it is clear that the present invention is well-adapted to carry out the objects and to attain the advantages mentioned herein, as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed herein.

What is claimed is:

1. A cover for protecting and covering an existing floor in a doorway, comprising:
a body having a first end, a second end, a first side, a second side, an outer peripheral edge, an upper surface and a lower surface, wherein the first side is provided with a first portion for receiving one side of the doorway and the second side is provided with a second portion for receiving an opposing side of the doorway wherein the first portion extends inwardly from the first side of the body to an end, the end of the first portion is provided with a plurality of tabs for adapting the floor cover to various sized doorways.

2. The cover of claim 1 wherein the first portion extends inwardly from the first side of the body to receive one side of the doorway.

3. The cover of claim 1 wherein the first portion is provided with a substantially U-shaped configuration.

4. The cover of claim 1 wherein the first portion extends inwardly from the first side of the body to an end, the first portion is provided with a notch extending inwardly from the end for receiving the one side of the doorway.

5. The cover of claim 4 wherein the notch is provided with a substantially U-shaped configuration.

6. The cover of claim 1 wherein the second portion extends inwardly from the second side of the body to receive one side of the doorway.

7. The cover of claim 1 wherein the second portion is provided with a substantially U-shaped configuration.

8. The cover of claim 1 wherein the second portion extends inwardly from the second side of the body to an end to receive an opposing side of the doorway from the first portion, the second portion is provided with a notch extending inwardly from the end for receiving the opposing side of the doorway.

9. The cover of claim 8 wherein the notch is provided with a substantially U-shaped configuration.

10. The cover of claim 1 wherein the body has an ingress/egress portion being sized and configured to prevent damage to the ingress/egress of the floor of the doorway, an enclosure portion being sized and configured to prevent damage to the floor of a room, and a doorway portion extending between the ingress/egress portion and the enclosure portion for preventing damage to the floor in the doorway.

11. The cover of claim 1 wherein the edge has at least one of a non-linear, irregular, and linear pattern.

12. The cover of claim 1 wherein the upper surface is provided with an abrasive material.

13. The cover of claim 1 wherein the lower surface is provided with a non-skid material.

14. A cover for protecting and covering an existing floor in a doorway, comprising:
a body having a first end, a second end, a first side, a second side, an outer peripheral edge, an upper surface and a lower surface, wherein the first side is provided with a first portion for receiving one side of the doorway and the second side is provided with a second portion for receiving an opposing side of the doorway wherein the second portion extends inwardly from the second side of the body to an end, the end of the second portion is provided with a plurality of tabs for adapting the floor cover to various sized doorways.

15. A method for positioning a floor cover on an existing floor about a doorway, comprising the steps of:

providing a body having a first end, a second end, a first side, a second side, an outer peripheral edge, an upper surface and a lower surface, wherein the first side is provided with a first portion for receiving one side of the doorway and the second side is provided with a second portion for receiving an opposing side of the doorway;

providing the body wherein the first portion extends inwardly from the first side of the body to an end, the end of the first portion is provided with a plurality of tabs and wherein the second portion extends inwardly from the second side of the body to an end, the end of the second portion is provided with a plurality of tabs;

positioning the first end of the floor cover on one side of the doorway; and positioning the first portion of the first side of the body about one side of the doorway and the second portion of the second side of the body about the opposing side of the doorway so that the first and second portions cooperate to hold the floor cover in a substantially secure position in the doorway.

16. The method of claim 15 further comprising the step of: removing at least one tab from the first portion.

17. The method of claim 15 further comprising the step of: removing at least one tab from the second portion.

18. The method of claim 15 further comprising the step of: positioning the second end of the floor cover on an opposing side of the doorway from the first end of the floor cover.

\* \* \* \* \*